UNITED STATES PATENT OFFICE.

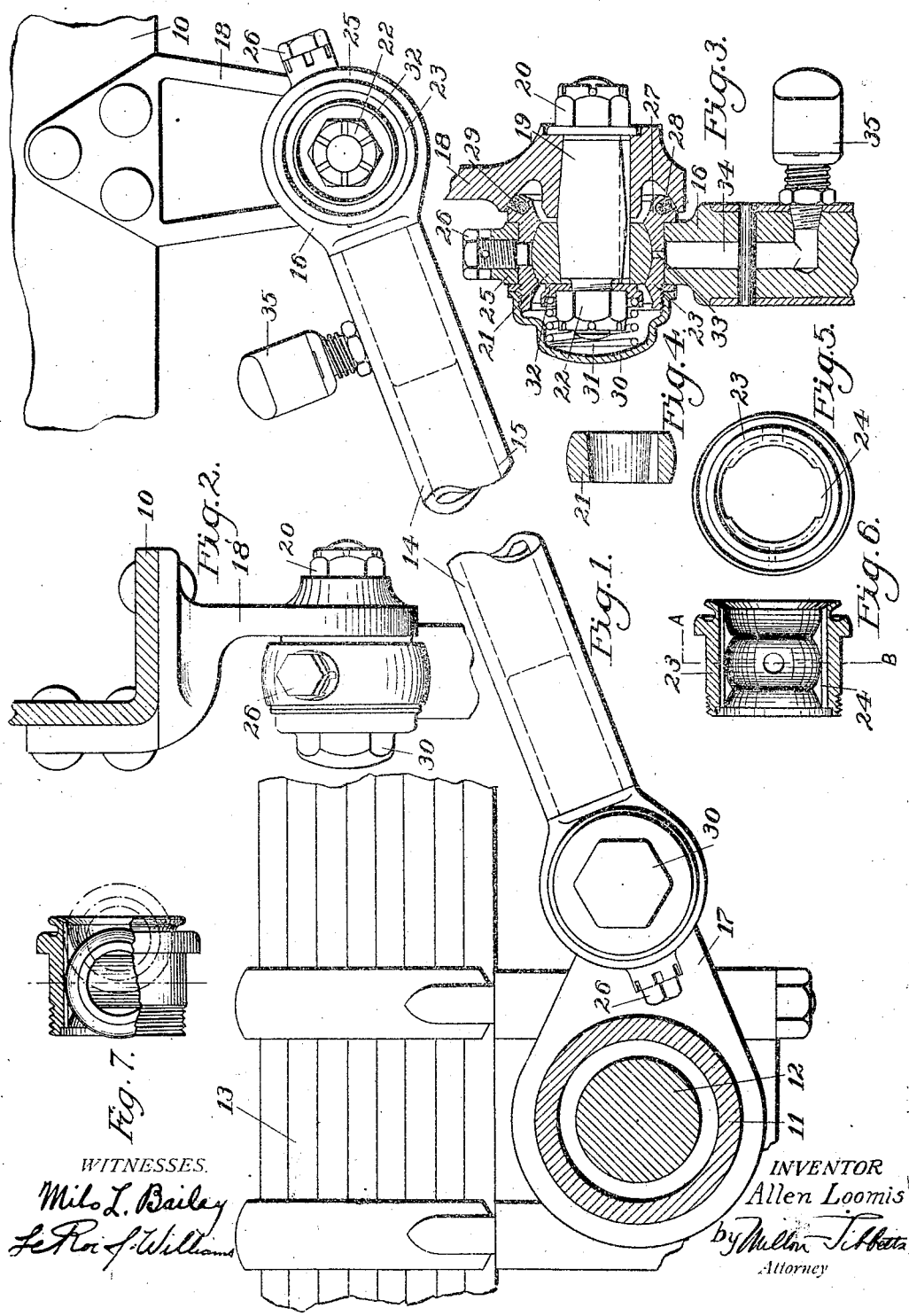

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,101,202.   Specification of Letters Patent.   Patented June 23, 1914.

Application filed October 10, 1912. Serial No. 725,010.

*To all whom it may concern:*

Be it known that I, ALLEN LOOMIS, a citizen of the United States, and resident of Detroit, Wayne county, State of Michigan, have invented certain new and useful Improvements in Motor-Vehicles, of which the following is a specification.

This invention relates to motor vehicles, and particularly to the running gear construction.

In most motor vehicles the driving axle is connected to the frame by means of springs, which permits the axle to oscillate relative to the frame, and in order to relieve these springs from the driving action of the axle, the latter is usually connected with the frame through tie rods or distance rods. The forward pivotal point of these tie rods determines the axis around which the axle oscillates, and as one end of the axle may move upwardly relative to the frame farther than the other end at a given time, the tie rods are necessarily oscillated somewhat about their longitudinal axes, so that their joints with the axle and the frame should preferably be of a universal character. In the present invention, one of these distance rods is illustrated as having ball and socket connection with both the axle and the frame, and as both of these joints are alike, only one of them will be described in detail.

One of the objects of this invention is to provide a tie rod having double universal joint connection, in which the joints may be freely lubricated and protected from dust, and in which the wearing parts may be easily and quickly removed and replaced.

Other objects will appear from the following description, taken in connection with the drawings, in which, Figure 1 is a side elevation and part section, showing parts of a motor vehicle frame and axle, together with a distance rod connecting them; Fig. 2 is a front elevation of the forward end of the distance rod and its bracket; Fig. 3 is a sectional view through one of the joints of the distance rod; Figs. 4, 5 and 6 are detail views; and Fig. 7 is a view with parts broken away showing two of the joint parts partly assembled.

Referring to the drawings, 10 represents one of the side bars of a motor vehicle frame. 11 is the tubular supporting axle housing the driving axle 12, and 13 is a spring by which the vehicle frame is supported upon the axle 11. The bar 14 is variously known as a tie rod, distance bar, or brace rod, and in the form shown it is composed of a tubular body portion 15, having end pieces 16 pinned or brazed thereto. The axle end of the rod 14 is connected to a bracket 17, and the forward end of the rod is connected to a bracket 18, suspended from the frame. The joints by which the rod is connected to pass these brackets will now be described in detail. A pin 19 is secured in the bracket 18, as by nut 20, and on the projecting end of this pin is a wearing member 21 in the form of the central zone of a sphere, this member being secured thereon by a taper fit and by a nut 22. This wearing member 21 is shown in detail in Fig. 4, and it is preferably keyed to the pin 19 to prevent rotation thereon. Surrounding the member 21 is a ring 23, the interior central part of which is also in the form of the central zone of a sphere, so that it has a working fit with the periphery of the member 21, and in order that the member 21 may be inserted into the ring 23, the latter is provided with opposed longitudinal slots 24, as shown particularly in Figs. 5 and 6. By means of these slots, the member 21 may be moved endwise into the center of the ring 23, and by then turning the member 21 about the axis A—B, it is held within the spherical part of said ring. The ring 23 is surrounded by the eye portion 25 of the end piece 16, and it is held against turning therein by a bolt 26.

From the above, it will be seen that a ball and socket joint is obtained, having a very large wearing surface, and in which the wearing member 21 is easily and cheaply renewed. To make the replacement, it is only necessary to remove the nut 22, slide the tie rod end, together with the wearing piece 21, off of the pin 19, and then remove the wearing piece 21 from the ring 23, the latter operation requiring simply that the wearing piece 21 be turned on its axis until it registers with the slots 24, and then removed endwise. A new wearing piece may as easily be put in place.

For the purpose of protecting the joint from dust and dirt, and for retaining grease or other lubricant on the working surfaces of the joint, the ring 23 is extended at its end adjacent the bracket 18 in the form of an angular flange 27, which enters a spherical groove 28 in the bracket. Packing material 29 is placed in a groove in the periphery of the flange 27 to obtain a good joint between said flange and the wall of the groove 28. The other end of the ring 23 is threaded and provided with a cap 30 and a spring 31 may be arranged between the cap and a washer 32, which is secured in place by the nut 22, whereby all play in the joint is taken up for the purpose of preventing rattle in the joint.

The joint may be packed in grease when it is assembled, or it may be supplied with grease or other lubricant through an opening 33 in the ring 23, a channel 34 in the shank of the end piece 16, and a grease cup 35 communicating with said channel.

It will be observed that the end of the distance rod has a universal action at the joint, so that there are no twisting strains on the rod as the supporting axle is moved in various directions relative to the frame, as by driving the vehicle over rough roads. It will also be noted that the joint is well protected from dirt and mud, and the lubricant supplied to it is retained therein.

Various modifications of the structure shown in the drawings may obviously be made without departing from the spirit and scope of the invention, and all such modifications are intended to be covered by the claims.

Having thus described my invention, what I claim and desire to secure by Letters Patent, is,

1. In a motor vehicle, the combination with a bracket, of a brace rod having an end piece in the form of an eye, a ring within said eye and secured thereto, a wearing member supported on the bracket and in contact with the ring, a cap over the outer end of said ring, and means between the inner end of said ring and said bracket for preventing the ingress of dirt to the joint.

2. A joint comprising an inner member in the form of the central zone of a sphere, and an outer member in the form of a ring having interior spherical surfaces to fit the inner member, said outer member being so formed that the inner member may be assembled in the outer member by moving it edgewise to a central position in the ring, and then turning it, as on a pivot, to bring the spherical surfaces in contact.

3. A joint comprising an inner member in the form of the central zone of a sphere, an outer member in the form of a ring adapted to surround the inner member, and having transverse slots through which the inner member may enter the ring, and a pin adapted to be secured to the inner member after it is in place, whereby the inner member is prevented from turning to removing position.

4. The combination with a bracket, a pin supported thereby, and a wearing member secured to said pin, of an outer member surrounding said wearing member and in contact therewith, a brace rod secured to said outer member, and a spring between said members to take up wear therein.

5. In a motor vehicle, the combination with a bracket, and a wearing member in the form of the central zone of a sphere secured to said bracket, of a ring surrounding said wearing member, a brace rod surrounding and secured to said ring, and a spring arranged between said wearing member and said ring to take up the wear between said members.

6. In a motor vehicle, the combination with a bracket, a pin supported thereby, and a wearing member in the form of the central zone of a sphere secured to said pin, of a ring surrounding said wearing member and having a packed joint in engagement with a spherical surface on said ring, and a brace rod secured to said ring.

7. In a motor vehicle, the combination with a bracket, a pin supported thereby, and a wearing member in the form of the central zone of a sphere secured to said pin, of a ring surrounding said wearing member and having a packed joint in engagement with a spherical surface on said bracket, a cap over the outer end of said ring, a brace rod secured to said ring, and a compression spring between said wearing member and said cap, whereby the wear in the joint is taken up.

8. The combination with a bracket and a brace rod, of a joint between said bracket and brace rod comprising a spherical member on the bracket and a ring on the brace rod, said brace rod and ring having channels leading to the wearing surfaces of the joint, and a grease cup on the brace rod in communication with the channel in the brace rod.

In testimony whereof I affix my signature in the presence of two witnesses.

ALLEN LOOMIS.

Witnesses:
JOHN D. WILSON,
ALFRED H. KNIGHT.

It is hereby certified that in Letters Patent No. 1,101,202, granted June 23, 1914, upon the application of Allen Loomis, of Detroit, Michigan, for an improvement in "Motor-Vehicles," an error appears in the printed specification requiring correction as follows: Page 2, claim 8 should be stricken out; and that the said Letters Patent should be read with this correction therein that the same may conform to the record of the case in the Patent Office.

Signed and sealed this 4th day of August, A. D., 1914.

[SEAL.]

J. T. NEWTON,
*Acting Commissioner of Patents.*